April 17, 1928.

H. HEIDE

PIPE CHAIN VISE

Filed June 9, 1925

INVENTOR
Henry Heide,
BY
ATTORNEY

April 17, 1928. 1,666,173
H. HEIDE
PIPE CHAIN VISE
Filed June 9, 1925 2 Sheets-Sheet 2
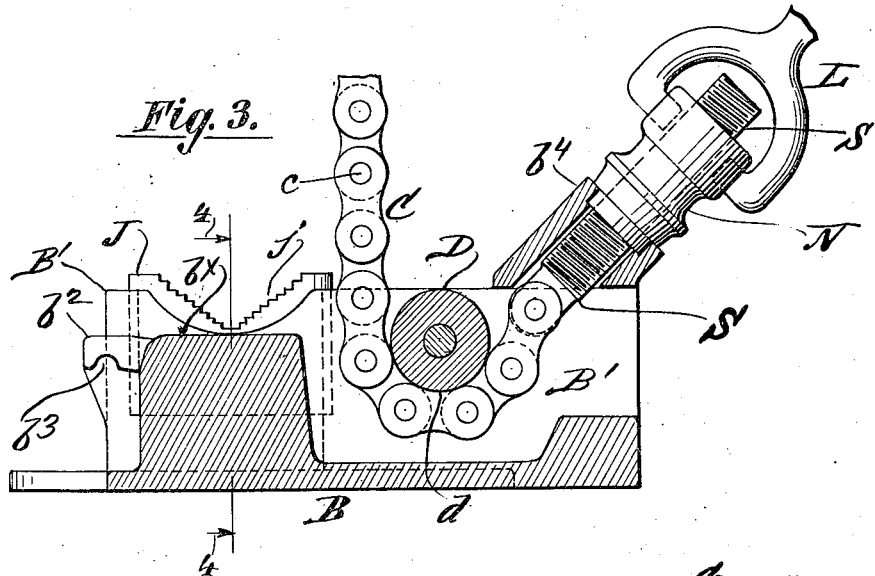
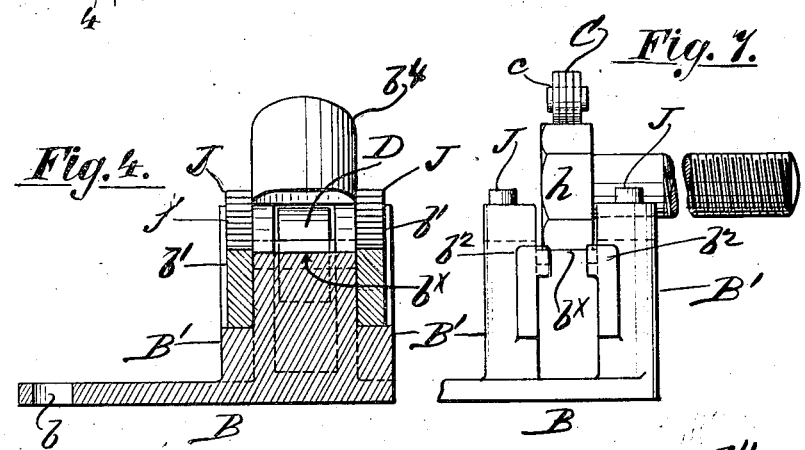
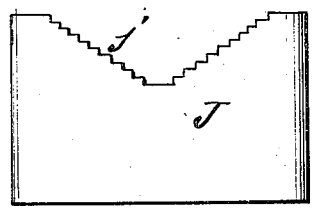
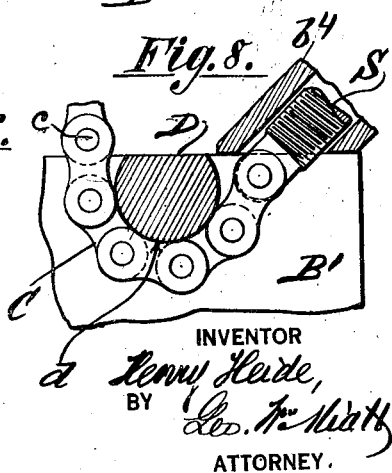
INVENTOR
Henry Heide,
BY
ATTORNEY.

Patented Apr. 17, 1928.

1,666,173

UNITED STATES PATENT OFFICE.

HENRY HEIDE, OF NEW YORK, N. Y.

PIPE CHAIN VISE.

Application filed June 9, 1925. Serial No. 35,864.

My improvements relate to the class of vises used for rigidly holding pipes, and for analogous purposes, by means of a binding chain in a manner well known, my object being mainly to simplify the manipulation thereof and my invention consists in the specific combination, construction and arrangement of parts and appurtenances described and claimed, whereby the device may be effectually operated with facility from above, and adjusted to the varying requirements of use, all as hereinafter fully set forth.

In the accompanying drawings I illustrate a practical embodiment of the essential features of my invention incorporated in a pipe chain vise, so called, of the character designated, although I do not limit myself to its use for pipes alone, since it is adapted to the clamping of articles other than pipes, nor do I limit myself to the identical form and construction of component parts of the device as shown herein by way of exemplification since changes may be made in minor details, and equivalent mechanical expedients resorted to, with like results, and without departing from the spirit and intent of my invention in this respect.

With this understanding:—

Fig. 1, represents a front side elevation of my improved chain clamp;

Fig. 2, a top view thereof;

Fig. 3, is a longitudinal section taken upon plane of line 3—3, Fig. 2;

Fig. 4, is a transverse section taken upon plane of line 4—4, Fig. 3;

Figs. 5 and 6, are detail views of one of the detachable jaw plates;

Fig. 7, is an elevation of the left hand end only of the device illustrating its use as a bolt clamp, the chain being shown in section;

Fig. 8, is a sectional detail like unto Fig. 3, in part, showing a modification in the construction of the chain deflector.

Figure 2:
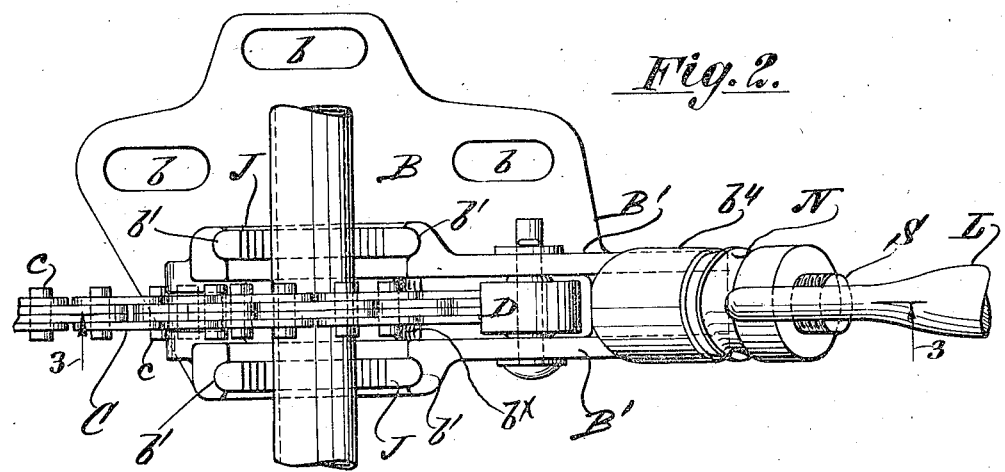

The base B, and the parallel standards B', B', extending vertically therefrom and upon and between which the operative parts of the device are mounted, are preferably united integrally, or formed in one piece,— the rear portion of said base B, extending well beyond the superstructure, as shown more particularly in Figs. 2 and 4, of the drawings, and being formed with elongate slots $b$, $b$, for the accommodation of bolts or screws by which the said base B, and standards B', B', may be rigidly secured in position upon a table, bench, or other appropriate support, adjacent to the edge thereof, so as to position the standards B', B', and operative parts thereon in convenient juxtaposition to the user of the vise without obstruction by or interference with such means of support. The base plate B may be considered as the supporting means for the article to be clamped.

Figure 1:
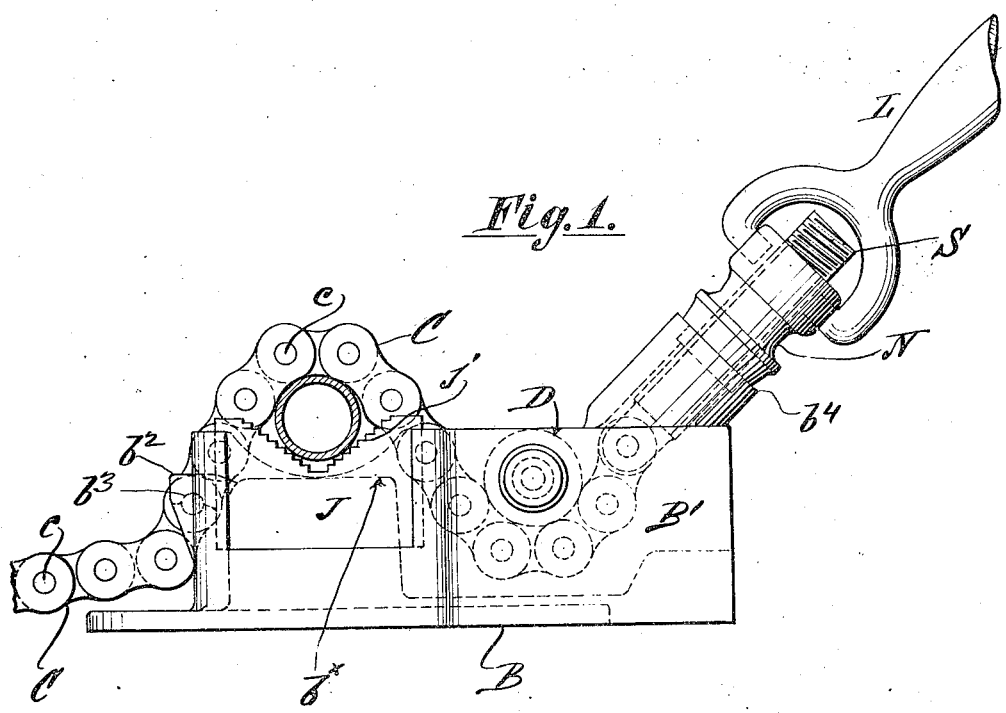

The left hand portion of the parallel standards B', B', are formed with sockets $b'$, $b'$, for the reception and support of twin gripping-jaw plates J, J, the vertical edges of which are bevelled or rounded convexly to fit into concavities constituting the grooves or sockets $b'$, $b'$, said gripping-jaw plates J, J, being removable upon occasion, as for replacement or substitution by others formed with teeth or serrations $j$, $j$, adapted to the requirements of the work to be accomplished, said serrated edges $j$, $j$, of the jaws J, J, being concave, or convergent as related to each other, as indicated more particularly in Figs. 1, 3 and 5, of the drawings.

Intervening between the sockets $b'$, $b'$, in which the gripping-jaw plates J, J, are positioned, is a platform $b^x$, integral with the base B, and standards B', B', said platform $b^x$, having a flat upper surface adapted to function as a rest and support for a bolt head, nut, or analogous object, or in fact any element to be treated having a flat surface for contactual engagement with said platform $b^x$, as indicated, for instance, in Fig. 7, of the drawings, (in which a bolt head $h$, is shown as positioned on the platform $b^x$,) thus rendering my improved chain vise device suitable not only to the accommodation and support of pipes, rods, and other analogous objects of circular cross section, but likewise to the treatment of objects of angular configuration, thereby greatly increasing the scope of utility of the vise, considered in a unitary sense.

Projecting from the left hand ends of the standards B', B', and from the medial platform $b^x$, are lateral lugs $b^2$, $b^2$, the under sides of which are formed with concavities $b^2$, $b^3$, which function as fulcrum bearings for contactual engagement with the protuberant ends of the chain-link pintles $c$, as indicated more especially in Figs. 1 and 2, of the drawings, the clamping chain C, being of the plate-link type in which said pintles function as the pivotal connections between the link plates in a manner well known in the art. The lugs $b^2$ support the end of the chain in alignment with the platform $b^x$ so that the chain may cooperate with the platform in supporting objects of angular configuration as subsequently described.

What may be designated as the inner end of the clamping chain C, is pivotally attached to the lower and inner end of an adjustive tightening screw S, upon which is mounted a power nut N. The tightening screw passes through an abutment or bearing sleeve $b^4$ between and integral with the right hand portion of the standards B', B' and extending upwardly therefrom at an angle to the base B, said power nut N being provided with an operative hand lever L, by means of which the nut may be conveniently manipulated.

A novel feature of my construction and arrangement of parts is the interposition between the tightening screw S, and nut N, and the gripping jaws J, J, and platform $b^x$, of a chain deflector D, preferably consisting of a roller mounted on a fixed axis between the standards B', B', as will be understood by reference particularly to Fig. 3, of the drawings, although any equivalent deflecting medium and surface may be substituted with substantially like results, such as a rigid bar with convex under surface for contact with the chain, although the roller is desirable as a means of reducing frictional resistance to a minimum degree.

By the provision of the deflector D, I am enabled to position the tension screw S, and nut N, at a suitable angle upward to facilitate manipulation thereof entirely from above and untrammeled and unrestricted by the support on which the chain vise is mounted. Hence said deflector D, may be of the modified construction indicated in Fig. 8, of the drawings, consisting of a solid or fixed cross bar or web between the opposed inner surfaces of the standards B', B', and integral therewith, formed with a convex surface $d$, for contactual engagement with the clamping chain in contra-distinction to the rotative convex surface $d$, of the deflector shown particularly in Figs. 2 and 3, of the drawings.

By affording free and unobstructed access to the manipulative hand lever L, well above, and upon the right of my chain vise and its support I obviate all danger of injury or inconvenience to the hand of the operator, and facilitate the practical operations in connection therewith. Furthermore by my construction and arrangement of parts of the device, the view of the operator thereof is free and unimpaired in so far as extraneous objects are concerned; and the device, as a unit, occupies a minimum of space consistent with its functions and capacity for use.

What I claim as my invention and desire to secure by Letters Patent, is:—

1. A chain vise of the character designated comprising a base, means thereon for supporting an article to be clamped, a clamping chain, means for holding one end of said chain, an adjustive tightening screw connected with the other end of said clamping chain, a stationary abutment sleeve projecting from said supporting means and inclined upwardly and outwardly at an angle to said base, a power nut engaging said screw and bearing upon said abutment sleeve for moving said screw in an upward and outward direction to tighten said chain, and a deflector interposed between said adjustive tightening screw and the means of support for the article to be clamped.

2. A chain vise of the character designated comprising a base, parallel standards extending therefrom for supporting an article to be clamped, a stationary abutment sleeve on said standards, said sleeve being inclined upwardly and outwardly to said base, a clamping chain, means for holding one end of said chain, an adjustive tightening screw connected with the other end of said clamping chain, a power nut engaging said screw and bearing upon said stationary abutment sleeve for moving said screw in an upward and outward direction to tighten said chain, and a deflector interposed between said adjustive tightening screw and the means of support for the article to be clamped, said deflector consisting of a roller mounted on a stationary axle supported between said parallel standards.

3. A chain vise of the character designated comprising a base, parallel standards extending therefrom for supporting an article to be clamped, a clamping chain, means for holding one end of said chain, a stationary abutment sleeve extending upwardly and outwardly from said standards at an angle to said base, an adjustive tightening screw connected with the other end of said clamping chain and extending through said abutment sleeve, a power nut engaging said screw and bearing upon said abutment sleeve for moving said screw in an upward and outward direction to tighten said chain, and a deflector interposed between said adjustive tightening screw and the means of support for the article to be clamped, said deflector being formed with a convex chain-bearing surface positioned between said parallel standards.

4. A chain vise comprising a base, parallel standards extending from said base, a platform intermediate said standards, a clamping chain, means for holding one end of said chain in alignment with said platform, an abutment projecting beyond the edges of said standards and inclined upwardly and outwardly at an angle to said base, and means including a member mounted in said abutment for movement in an upward and outward direction to tighten said chain around an article resting upon said standards, the path of movement of said member being wholly on the same side of the base as said standards.

5. A chain vise comprising a base member, parallel standards extending from said base, said standards being adapted to receive an article to be clamped, a clamping chain, means for fastening one end of said chain, an abutment projecting upwardly and outwardly beyond the edges of said standards, and means including a member mounted in said abutment for movement in an upward and outward direction to tighten said chain about an article resting upon said standards, the path of movement of said member being wholly on the same side of said base as said standards.

6. A chain vise comprising a base, parallel standards extending from said base, gripping jaws mounted on said standards, a clamping chain, means for fastening one end of said chain, a hollow abutment projecting upwardly and outwardly beyond the edges of said standards at a point removed from said gripping jaws, and means including a member mounted in said abutment for movement in an upward and outward direction to tighten said chain about an article resting on said gripping jaws, the path of movement of said member being wholly on the same side of the base as said standards.

HENRY HEIDE.